United States Patent
Hochmuth et al.

(10) Patent No.: US 7,064,765 B2
(45) Date of Patent: Jun. 20, 2006

(54) SYSTEM AND METHOD FOR GRABBING FRAMES OF GRAPHICAL DATA

(75) Inventors: Roland M. Hochmuth, Fort Collins, CO (US); Johnny Marks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 187 days.

(21) Appl. No.: 10/178,728

(22) Filed: Jun. 24, 2002

(65) Prior Publication Data

US 2003/0234790 A1 Dec. 25, 2003

(51) Int. Cl.
G09G 5/36 (2006.01)
G09G 5/399 (2006.01)

(52) U.S. Cl. .................. 345/545; 345/539; 345/547

(58) Field of Classification Search ............... 345/545, 345/539, 547; 348/42, 57; 352/57; 359/462
See application file for complete search history.

(56) References Cited

U.S. PATENT DOCUMENTS

| | | | | |
|---|---|---|---|---|
| 5,229,850 A * | 7/1993 | Toyoshima | ............... | 348/153 |
| 5,245,319 A | 9/1993 | Kilian | ............... | 345/9 |
| 5,587,726 A | 12/1996 | Moffat | ............... | 345/201 |
| 5,604,509 A | 2/1997 | Moore et al. | ............... | 345/2 |
| 5,748,252 A | 5/1998 | Draves | ............... | 348/516 |
| 5,990,967 A | 11/1999 | Kawakami et al. | ............... | 348/500 |
| 6,020,901 A | 2/2000 | Lavelle et al. | ............... | 345/509 |
| 6,105,049 A | 8/2000 | Govindaraju et al. | ............... | 709/102 |
| 6,144,362 A | 11/2000 | Kawai | ............... | 345/115 |
| 6,157,374 A * | 12/2000 | West et al. | ............... | 345/539 |
| 6,184,907 B1 | 2/2001 | Min | ............... | 345/521 |
| 6,222,550 B1 | 4/2001 | Rosman et al. | ............... | 345/419 |
| 6,239,717 B1 | 5/2001 | Weissbrod et al. | ............... | 340/815.4 |
| 6,297,843 B1 | 10/2001 | Glew | ............... | 348/14.13 |

* cited by examiner

Primary Examiner—Matthew C. Bella
Assistant Examiner—Hau Nguyen (57) ABSTRACT

A frame-grabbing system in accordance with an exemplary embodiment of the present invention comprises a frame buffer, a graphics adapter, video output interface and logic. The graphics adapter is configured to receive graphics commands from a graphics application and to render graphical data from the graphics commands to the frame buffer. The video output interface is configured to read the frame buffer and to transmit a video data signal based on graphical data stored in the frame buffer. The logic is configured to perform, in response to a frame grab request, a frame grab of an image frame based on the video data signal, the frame defined by the graphical data stored in the frame buffer. The logic is further configured to prevent, in response to the frame grab request, the graphics adapter from updating the frame buffer during the frame grab.

26 Claims, 7 Drawing Sheets

SYSTEM AND METHOD FOR GRABBING FRAMES OF GRAPHICAL DATA

BACKGROUND OF THE INVENTION

1. Field of the Invention

The present invention relates generally to graphical data-rendering systems, and more particularly to a system and method for grabbing frames of graphical data.

2. Related Art

Graphics adapters are commonly used to render graphical data locally to a graphics display device, such as a cathode ray tube, for example. Typically, a graphics adapter interfaces with a peripheral component interconnect (PCI) local bus or an accelerated graphics port (AGP) of a computer. AGP is an interface specification designed specifically for the throughput demands of three-dimensional (3-D) graphics.

Typically, a graphics application generates graphics commands (e.g., primitives) that define an image to display. The graphics commands are transmitted to the graphics adapter, which then renders the image in response to the graphics commands. In rendering such an image, the graphics adapter translates the received graphics commands into image data and stores this image data to a frame buffer. The image data is then output from the frame buffer to a display device, which displays the image-based on the image data.

Note that an image defined by graphics commands from a graphics application may be ultimately rendered to be remotely visualized over a network connection. In this regard, a graphics application of a remote server typically generates graphics commands, as described above, and the local server transmits these commands to a remote client over a network. The remote client then utilizes a graphics adapter to render the images defined by the graphics commands. Any process for enabling a remote client to display images from a graphics application running on a local system shall be referred to herein as "remote graphical visualization" or "remote visualization."

Transmission of the graphics commands to a remote client can introduce significant delays in performing remote graphical visualization. Indeed, in some instances, particularly when the graphics commands comprise a large amount of data, it is more efficient for the local server to render the graphics commands and to transmit, to the remote client, the rendered data in lieu of the graphics commands. Performing remote visualization in this way will be referred to hereafter as "image-based remote visualization."

To effectuate image-based remote visualization, a frame grabber apparatus is often employed. In this regard, a graphics adapter of the local server receives graphics commands from a graphics application and renders the graphical data defined by the graphics commands to a frame buffer. A frame grabber apparatus then periodically grabs the image frame stored in the frame buffer, and each grabbed frame is transmitted over a network to a remote client, which displays each such frame.

However, current frame grabber apparatuses are not suitable for enabling all types of remote visualization. For example, conventional frame grabber apparatuses are not generally suitable for enabling remote stereographic visualization. In this regard, stereographic visualization is a relatively complex method of rendering three-dimensional graphics to a display device. During stereographic visualization, two slightly different perspectives (i.e., a left perspective and a right perspective) of the same image are combined in a frame buffer to create a stereographic three-dimensional (3-D) image frame. The left and right image perspectives are read out of the frame buffer in an alternating fashion such that the display of the stereographic image frame is quickly alternated between the left and right perspectives, and a user typically views the stereographic image frame through shutter glasses that are synchronized to provide visualization alternating between the left and right perspectives. In particular, the glasses block the user's right-eye view when the left perspective is being displayed, and the glasses block the user's left-eye view when the right perspective is being displayed.

Unfortunately, conventional frame grabber apparatuses are not designed to ensure that each grabbed frame corresponds to only one image. In this regard, if a buffer swap occurs while a frame grabber apparatus is grabbing a set of data, then the frame buffer being read by the frame grabber apparatus during the frame grab may be updated with a new image before the frame grab is complete. As a result, a portion of the grabbed frame may comprise graphical data defining the new image, and another portion of the grabbed frame may comprise graphical data defining the image previously stored in the frame buffer. Accordingly, when the grabbed frame is displayed, the displayed frame undesirably comprises portions of two different images.

Note that such a phenomena is particularly problematic for stereographic visualization. In this regard, as described above, each displayed image in stereographic visualization preferably comprises a left perspective and a right perspective of the same image. However, if a buffer swap occurs during a frame grab, then it is possible for at least one of the perspectives of a displayed frame to include graphical data defining a different image than the other perspective of the displayed frame, thereby degrading the "stereo" perception, as well as the overall quality, of the displayed image. When the graphical images are being both rendered and displayed locally, the refresh rates are usually such that the aforedescribed phenomena is not generally noticeable to a viewer. However, due to transmission delays, the refresh rates during remote visualization are often slower, and the effects of the aforedescribed phenomena usually become more pronounced.

SUMMARY OF THE INVENTION

A frame-grabbing system in accordance with an exemplary embodiment of the present invention comprises a frame buffer, a graphics adapter, video output interface, and logic. The graphics adapter is configured to receive graphics commands from a graphics application and to render graphical data from the graphics commands to the frame buffer. The video output interface is configured to read the frame buffer and to transmit a video data signal based on graphical data stored in the frame buffer. The logic is configured to perform, in response to a frame grab request, a frame grab of an image frame based on the video data signal, the image frame defined by the graphical data stored in the frame buffer. The logic is further configured to prevent, in response to the frame grab request, the graphics adapter from updating the frame buffer during the frame grab.

Another embodiment of the present invention provides a frame-grabbing method. The method can be broadly conceptualized by: rendering graphical data to a frame buffer, transmitting a video data signal based on graphical data stored in the frame buffer, grabbing, in response to a frame grab request and based on the video data signal, an image frame defined by the graphical data stored in the frame buffer, and delaying, in response to the frame grab request, an update to the frame buffer.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the figures.

DETAILED DESCRIPTION

In general, the present invention provides a system and method for grabbing frames of graphical data. In a preferred embodiment, the frame-grabbing system, while grabbing an image frame from a frame buffer, prevents updates to the frame buffer, thereby ensuring the integrity of the grabbed data. In particular, the frame-grabbing system, by preventing updates to the frame buffer during a frame grab, ensures that all of the grabbed image frame corresponds to the same image. As will be described in more detail hereafter, such a frame-grabbing system is particularly suited for performing image-based remote visualization of stereographic data. However, the frame-grabbing system may be utilized in non-stereographic environments, as well, for ensuring the integrity of non-stereographic image frames.

Figure 1:
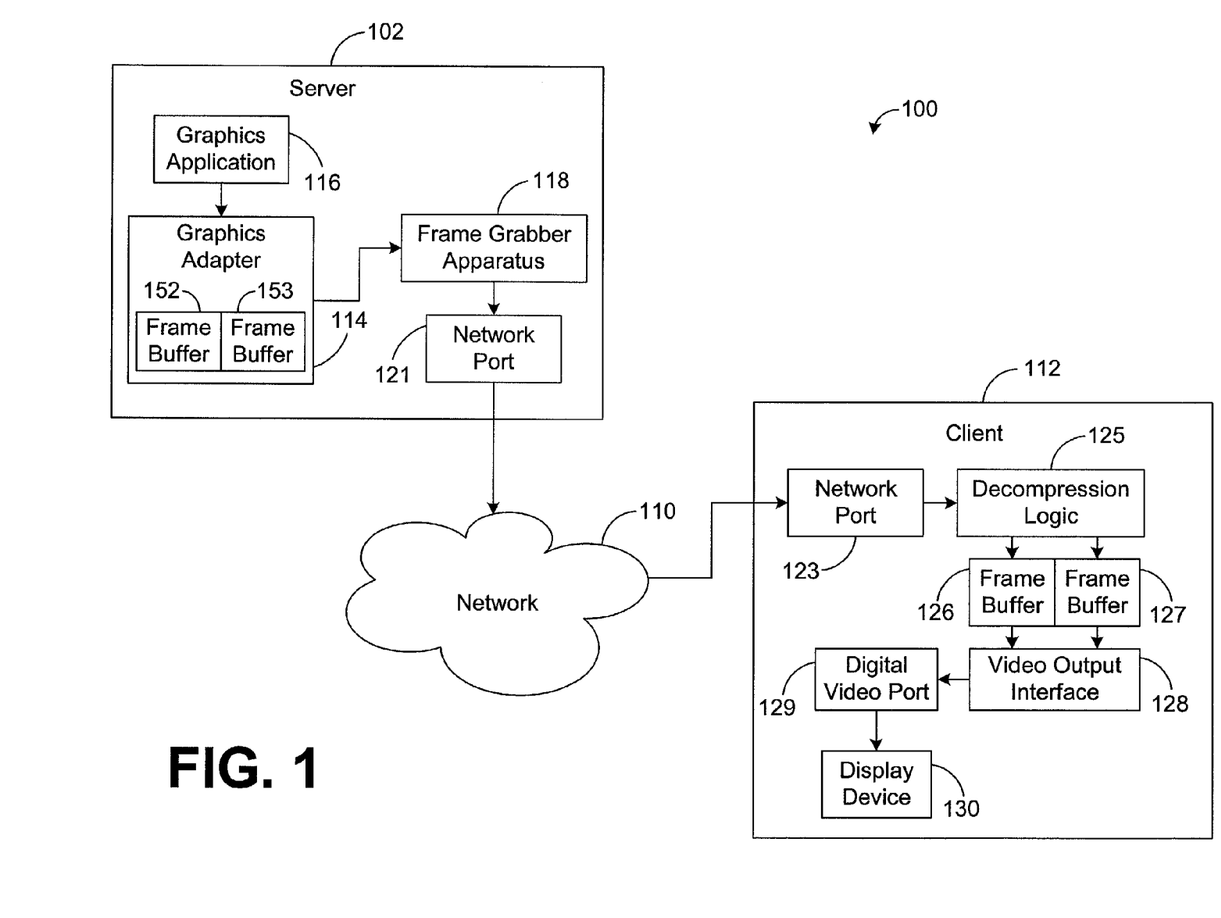
FIG. 1 is a block diagram illustrating an exemplary embodiment of a remote visualization system in accordance with the present invention.

FIG. 1 generally depicts a system 100 hereafter referred to as "remote visualization system" in accordance with a preferred embodiment of the present invention. As shown by FIG. 1, the remote visualization system 100 preferably comprises a server 102 that communicates with a remote client 112 over a network 110. The network 110 can be a local-area-network (LAN) or a wide-area-network (WAN) and can communicate via any known or future-developed network protocol, such as transmission control protocol/Internet protocol (TCP/IP) or systems network architecture (SNA), for example.

In the preferred embodiment, a graphics adapter 114 at the server 102 receives graphics commands from a graphics application 116 and, based on these commands, renders stereographic image frames to a plurality of frame buffers (not specifically shown in FIG. 1). Each stereographic image frame stored in one of the frame buffers 152 or 153 preferably comprises a left perspective and a right perspective of an image. When desired, a frame grabber apparatus 118 preferably grabs a stereographic image frame being read from one of the frame buffers 152 or 153. The grabbed stereographic image frame is then compressed and transmitted, via a network port 121, over the network 110 to a network port 123 of the remote client 112.

Decompression logic 125 at the remote client 112 decompresses the stereographic image frame and stores the stereographic image frame into a frame buffer 126 or 127. A video output interface 128 then reads the stereographic image frame and transmits the stereographic image frame to a video output port 129 that is interfaced with a display device 130. Based on the data provided to the video output port 129 by the video output interface 128, the display device 130 displays the stereographic image frame. Thus, the system 100 enables remote visualization of a stereographic image rendered at the server 102.

Figure 2:
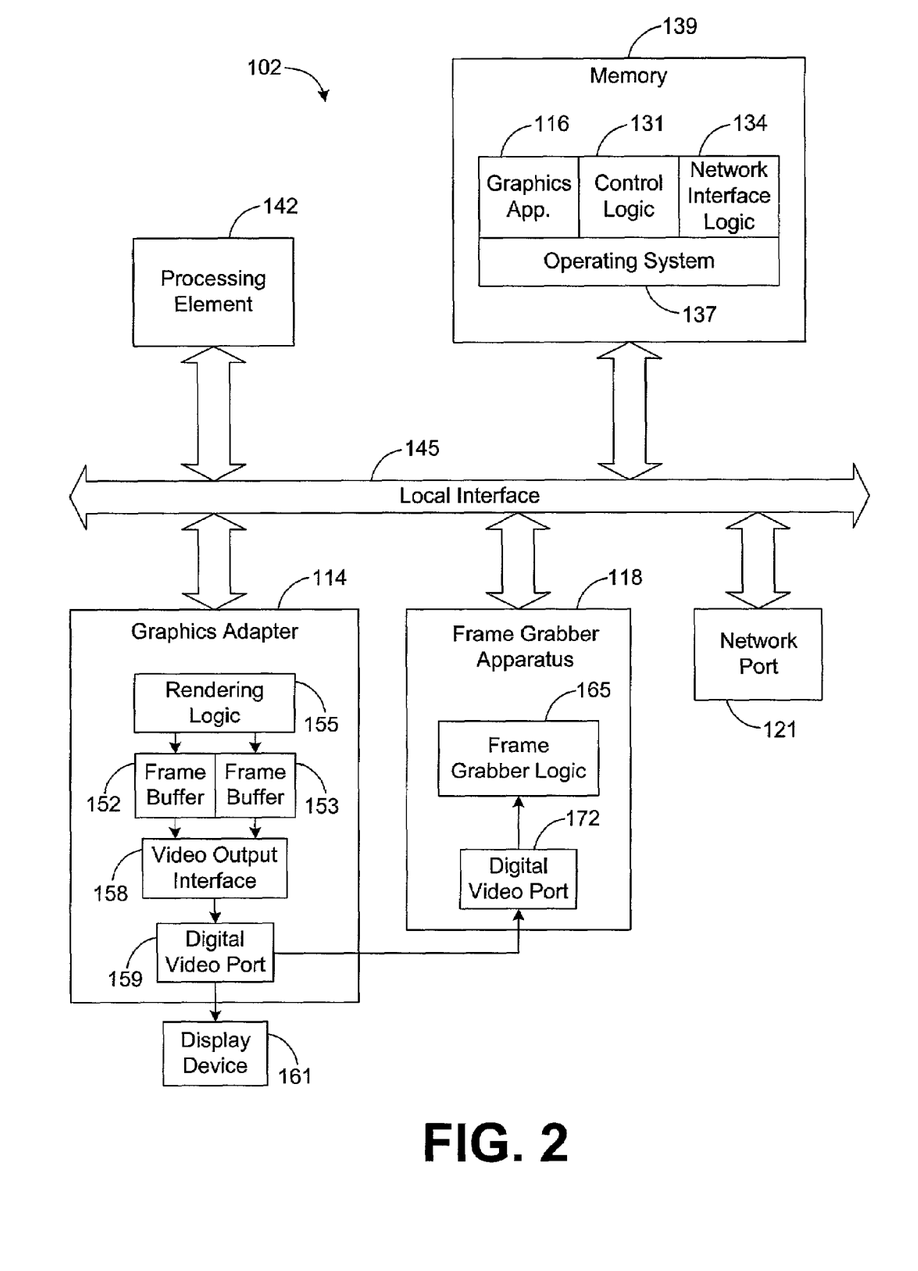
FIG. 2 is a block diagram illustrating a server, such as is depicted in FIG. 1, for grabbing image frames in accordance with an exemplary embodiment of the present invention.

FIG. 2 depicts a more detailed view of the server 102 of the preferred embodiment. As shown by FIG. 2, the server 102 preferably comprises the graphics application 116, frame grabber control logic 131, network interface logic 134, and an operating system (OS) 137 for generally controlling the operation of the server 102, as will be described in more detail hereafter. The graphics application 116, the frame grabber control logic 131, the network interface 134, and the operating system 137 can be implemented in software, hardware, or any combination thereof. In the preferred embodiment, as illustrated by way of example in FIG. 2, each of the foregoing components, along with its associated methodology, is implemented in software and stored in server memory 139.

Note that the foregoing components, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the graphics application 116, the frame grabber control logic 131, the network interface 134, and/or the operating system 137 may be magnetically stored and transported on a conventional portable computer diskette or disc.

The preferred embodiment of the server 102 of FIG. 2 further comprises one or more conventional processing elements 142, such as a digital signal processor (DSP) or a central processing unit (CPU), that communicate to and drive the other elements within the server 102 via a local interface 145, which can include one or more buses. Access to the processing element 142 and other resources of the server 102 is preferably controlled via the operating system 137. Note that any known or future-developed operating system, such as Windows, Unix, etc., may be employed to implement the operating system 137 of FIG. 2.

During operation, the graphics application 116 is configured to issue graphics commands, which are transmitted to the graphics adapter 114. In response to the graphics commands, rendering logic 155 within the graphics adapter 114, via known or future-developed graphical-rendering techniques, renders graphical data defining graphical images to frame buffers 152 and 153. This rendering logic 155 may be implemented in software, hardware, or any combination thereof, and when implemented in software, the rendering logic 155 may be stored on a computer-readable medium.

In the preferred embodiment, double-buffering techniques are preferably employed to write to and read out of the frame buffers 152 and 153. In this regard, as the rendering logic 155 is rendering graphical data to one of the buffers 152 or 153, a video output interface 158 is preferably reading the opposite buffer 152 or 153 and providing the data read from the opposite buffer 152 or 153 via a video data signal to a digital video port 159. This video output interface 158 comprises logic that may be implemented in software, hardware, or any combination thereof, and when implemented in software, the logic of the video output interface 158 may be stored on a computer-readable medium. The data provided to the digital video port 159 may be fed to a display device 161, which may display the image defined by such data.

Note that the frame buffer 152 or 153 receiving rendered data from the rendering logic 155 is referred to as "the back buffer," and the frame buffer 152 or 153 being read by the video output interface 158 is referred to as "the front buffer." The rendering logic 155 continues rendering to the "back buffer," and the video output interface 158 continues reading from the "front buffer" until a buffer swap occurs. When a buffer swap occurs, the rendering logic 155 and the video output interface 159 swap which of the buffers 152 and 153 are being accessed by the rendering logic 155 and the video output interface 158, respectively. In other words, the front and back buffers are swapped.

For example, assume that the frame buffer 152 is currently the "back buffer" and that the rendering logic 155 is, therefore, rendering to the buffer 152. In such an example, the frame buffer 153 is currently the "front buffer" and is, therefore, being read by the video output interface 158. In response to a buffer swap command from the graphics application 116, the rendering logic 155 initiates a buffer swap. In performing the buffer swap, the rendering logic 155 begins to render graphical data to the frame buffer 153, which is now the "back buffer," instead of rendering to frame buffer 152. Furthermore, the video output interface 158 begins to read graphical data from the frame buffer 152, which is now the "front buffer," instead of reading from frame buffer 153.

Upon the occurrence of the next buffer swap, the rendering logic 155 begins to render graphical data to the frame buffer 152, which is again considered to be the "back buffer," and the video output interface 158 begins to read graphical data from the frame buffer 153, which is again considered to be the "front buffer." Such double-buffering techniques are generally well-known in the art and are employed in many high-performance graphics adapters.

Note that double-buffering generally allows an image to be completely rendered to a frame buffer before it is displayed. Without utilizing double-buffering or other similar type of buffering (e.g., triple-buffering), a frame buffer is normally read by a display device and associated logic while a graphics adapter is rendering to the frame buffer. In such a situation, the animation quality of the displayed images can be significantly degraded depending on the rendering speed of the graphics adapter and the refresh rate of the display device.

In the preferred embodiment, the rendering logic 155 is configured to render graphical data to the frame buffers 152 and 153 such that each of the frame buffers 152 and 153 defines a stereographic image. In this regard, when rendering an image to a frame buffer 152 or 153, the rendering logic 155 renders a left perspective of the image to a portion, referred to hereafter as the "left perspective portion," of the frame buffer 152 or 153, and the logic 155 renders a right perspective to the remainder, referred to hereafter as the "right perspective portion," of the frame buffer 152 or 153. Therefore, the frame buffer 152 or 153 preferably comprises graphical data defining both a left and right perspective of the same image.

Furthermore, when the video output interface 158 is reading a frame buffer 152 or 153, the interface 158 preferably reads the left perspective portion and the right perspective portion of the buffer 152 or 153 in an alternating fashion. More specifically, the video output interface 158 preferably reads the left perspective portion and, while reading the left perspective portion, provides a video data signal comprising the read graphical data to the digital video port 159. After reading the entire left perspective portion, the video output interface 158 begins reading and providing to the video output port 159 graphical data from the right perspective portion of the same frame buffer 152 or 153. After completely reading the right perspective portion, the interface 158 repeats the process of reading the left and right perspective portions of the same buffer 152 or 153 until a buffer swap occurs.

Once a buffer swap occurs, the video output interface 159 preferably begins reading the left and right perspective portions of the other frame buffer 152 or 153 in an alternating fashion via similar techniques. Note that, in other embodiments, other techniques may be employed to read the frame buffers 152 and 153, and the rendering logic 155 can be configured to render non-stereographic images to the frame buffers 152 and 153.

In the preferred embodiment, the frame grabber control logic 131 instructs frame grabber logic 165 residing on the frame grabber apparatus 118 to grab a frame of data from the graphics adapter 114. For example, during image-based stereographic remote visualization, the remote client 112 (FIG. 1) may receive graphical data rendered via the graphics adapter 114 of the server 102 and display an image based on this graphical data. Periodically, the server 102 may receive a frame grab request (e.g., a refresh request). Such a request may be received from the remote client 112 or from some other source. In response to the frame grab request, the frame grabber control logic 131 may instruct the frame grabber logic 165 to grab an image frame from the graphics adapter 114. This frame grabber logic 165 may be implemented in software, hardware, or any combination thereof, and when implemented in software, the frame grabber logic 165 may be stored on a computer-readable medium.

Note that, in the preferred embodiment, the frame grabber control logic 131 controls the frame grabber logic 165 such that the left and right perspectives of the image frame grabbed by the logic 165 correspond to the same image. To achieve this, the frame grabber control logic 131, before instructing the logic 165 to grab an image frame, preferably locks the graphics adapter 114. When locked, the graphics adapter 114 and, more specifically, the rendering logic 155 of the graphics adapter 114 is prevented from executing graphics commands. Therefore, when the graphics adapter 114 is locked, the graphics application 116 is preferably prevented from instructing the rendering logic 155 to update the data in the frame buffers 152 and 153.

There are a variety of methodologies that may be employed to lock the graphics adapter 114. In the preferred embodiment, the control logic 131 submits, to the operating system 137, a system call for locking the graphics adapter 114. In response, the operating system 137 refrains from servicing any requests for accessing the graphics adapter 114 until the graphics adapter 114 is later unlocked, as will be described in more detail below. For example, after the operating system 137 receives a request to lock the graphics adapter 114, the operating system 137 may receive a system call from the graphics application 116 requesting the transmission of a graphics command to the graphics adapter 114. In such a situation, the operating system 137 refrains from servicing the transmission request thereby preventing the requested transmission. The operating system 137 continues operating in this manner until the graphics adapter 137 is later unlocked.

Moreover, after requesting a graphics adapter lock, the control logic 131 preferably waits a sufficient amount of time for the graphics adapter 114 to reach a quiescent state. In other words, the control logic 131 waits until all previously issued graphics commands sent to the graphics adapter 114 have been fully processed such that no further updates to the buffers 152 and 153 will occur in response to these commands. Once a quiescent state is reached, the control logic 131 instructs the frame grabber logic 165 to grab an image frame, which comprises both a left-image perspective and a right-image perspective, from the graphics adapter 114. In response, the frame grabber logic 165 grabs the image frame stored in the "front buffer" (i.e., the buffer 152 or 153 being read by the video output interface 158). Note that various techniques, including known or future-developed frame-grabbing techniques, may be employed by the frame grabber logic 165 to grab this image frame.

Furthermore, it should be noted that locking the graphics adapter 114 before initiating a frame grab helps to ensure that the left and right perspectives grabbed by the frame grabber logic 165 correspond to the same image. In this regard, locking the graphics adapter 114 prevents the rendering logic 155 and other components of the system 102 from updating the frame buffers 152 and 153. In particular, locking the graphics adapter 114 prevents the adapter 114 from executing front buffer write commands (e.g., commands pertaining to two-dimensional graphical user interfaces) and buffer swap commands while the logic 165 is grabbing an image frame. Moreover, if such commands are executed while the logic 165 is grabbing an image frame, then it is possible for the rendering logic 155 to update the frame being grabbed by the frame-grabbing logic 165 before the frame grab is complete. Thus, by failing to not lock the graphics adapter 114, it is possible for a portion of the grabbed frame to correspond to one image and for another portion of the grabbed frame to correspond to another image.

For example, assume that the frame grabber logic 165 is grabbing an image frame from frame buffer 152. Initially, the frame grabber logic 165 may grab a right perspective of the image stored in the frame buffer 152. However, if a buffer swap occurs while the frame grabber logic 165 is grabbing the left perspective, then a new image may be written to the frame buffer 152 before the frame grab is complete. As a result, at least a portion of the left perspective grabbed by the logic 165 may correspond to the new image written to the frame buffer 152 during the frame grab.

However, preventing updates to the frame buffers 152 and 152 by locking the graphics adapter 114 prior to the frame grab prevents such problems from occurring, thereby helping to ensure that both perspectives grabbed by the frame grabber logic 165 correspond to the same image.

Once the frame grab is complete, the frame grabber logic 165 preferably notifies the control logic 131. Note that frame grabber logic 165 may employ known or future-developed notification techniques (e.g., transmission of a notification signal, setting of a notification flag, etc.) in order to notify the frame grabber logic 165 when the frame grab is complete. Once the control logic 131 is notified that the frame grab is complete, the control logic 131 preferably unlocks the graphics adapter 114 so that the graphics adapter 116 or any other server component may again access the graphics adapter 114 and, in particular, cause the graphics adapter 114 to update the data in the frame buffers 152 and 153.

In the preferred embodiment, the control logic 131 unlocks the graphics adapter 114 by submitting, to the operating system 137, a system call for unlocking the graphics adapter 114. In response, the operating system 137 begins to service requests for accessing the graphics adapter 114 from the other components of the server 102. Therefore, once the unlock system call is received by the operating system 137, the operating system 137 allows the graphics application 116 and other components of the server 102 to again transmit graphics commands to the graphics adapter 114.

After an image frame is grabbed by the frame-grabbing logic 165 as described above, the control logic 131 preferably compresses the grabbed image frame and instructs the network interface logic 134 to transmit the compressed image frame to the remote client 112 (FIG. 1). In responding to this instruction, the network interface logic 134 may perform any desirable processing of the compressed image frame. For example, if the network 110 employs TCP/IP, the network interface logic 134 may be configured to packetize the compressed image frame into one or more IP packets and to transmit the IP packets over the network 110 via the network port 121. In other examples, the network interface logic 134 may perform other types of processing on the compressed image frame before transmitting the compressed image frame over the network 110.

Referring to FIG. 1, once the remote client 112 receives the compressed image frame, decompression logic 125 decompresses the image frame, and via conventional techniques, the display device 130 displays the stereographic image defined by the decompressed data. In this regard, the decompression logic 125 may store the decompressed image frame into one of the frame buffers 126 or 127 and then initiate a buffer swap. For example, if the video output interface 128 is currently reading from buffer 126, the decompression logic 125 may store the decompressed image frame into frame buffer 127 and then initiate a buffer swap. In response to the buffer swap, the video output interface 128 may begin reading and providing, to the video output port 129, the left and right-image perspectives stored in the buffer 126. Thus, the display device 130 begins displaying the left and right-image perspectives of the image frame that was previously grabbed according to the techniques described above. However, it should be noted that other techniques may be employed by the remote client 112 to render the grabbed image frame, if desired.

As previously set forth above, there are a variety of methodologies that may be employed by the frame grabber logic 165 to grab an image frame from the graphics adapter 114. In the preferred embodiment, the frame grabber logic 165 grabs the image frame via a digital video port 172 of the frame grabber apparatus 118. In this regard, the digital video port 172 of the frame grabber apparatus 118 is preferably interfaced with the digital video port 159 of the graphics adapter 114. The video data signal transmitted to the digital video port 159 by the video output interface 158 is preferably passed to the digital video port 172, and data from this signal is accessible to the frame grabber logic 165. Moreover, in the preferred embodiment, the signal transmitted from the video output interface 158 to the digital video port 159 and then to the digital video port 172 is a serial video data signal, although non-serial video data signals may be utilized in other embodiments.

As previously set forth above, the video output interface 158 is preferably configured to transmit data read from one of the frame buffers 152 or 153, referred to as the "front buffer," and when a buffer swap occurs, the video output interface 158 begins transmitting data from the opposite buffer 152 or 153. Furthermore, when transmitting data from a frame buffer 152 or 153, the video output interface 158 preferably transmits, in an alternating fashion, the left and right-image perspectives stored in the frame buffer 152 or 153. That is, when the video output interface 158 is transmitting one of the image perspectives stored in a frame buffer 152 or 153, the video output interface 158 preferably waits until it has completely transmitted the one perspective to the digital video port 159 before beginning to transmit the other perspective.

Note that, to assist the frame grabber logic 165 in grabbing a complete frame from the graphics adapter 114, the video output interface 158 preferably provides a frame perspective identifier identifying whether the frame buffer data being transmitted by the video output interface 158 corresponds to a left perspective or a right perspective. In the preferred embodiment, the frame perspective identifier is included in a header or footer of each data word in the video signal transmitted to the digital video port 159. For example, the frame perspective identifier may comprise a one-bit identifier that precedes (header) or follows (footer) its corresponding word in the video signal transmitted to the video port 159. In such an example, the video output interface 158 may assert the frame perspective identifier within the header or footer of each word that defines one or more pixels of a left perspective, and the video output interface 158 may deassert the frame perspective identifier within the header or footer of each word that defines one or more pixels of a right perspective.

Note that, in some embodiments, the video output interface 158 may begin transmitting a new frame perspective upon each occurrence of a vertical retrace. For example, the video output interface 158 may begin transmitting a right perspective upon a first occurrence of a vertical retrace and then begin transmitting a left perspective upon the next occurrence of a vertical retrace. In such an embodiment, the video output interface 158 may be configured to transition the frame perspective identifiers inserted into the words transmitted to the digital video data port 159 in response to vertical retrace occurrences.

As an example, assume that the video output interface 158 is deasserting the frame perspective identifiers of the words being transmitted to the digital video port 159 just prior to the occurrence of a vertical retrace. In response to the occurrence of the vertical retrace, the video output interface 158 may begin asserting the frame perspective identifiers of the words transmitted to the digital video port 159, thereby indicating the occurrence of the vertical retrace and indicating that video output interface 158 is now transmitting data words of a different perspective.

In other embodiments, the video output interface 158 may utilize other techniques for providing the frame perspective identifiers. For example, in embodiments where the left and right perspectives are respectively stored in the same frame buffer locations for different images, the video output interface 158 may be configured to identify whether a data word corresponds to a left perspective or a right perspective based on the word's location in the frame buffer 152 or 153. In another example, the frame perspective identifiers may be stored in the frame buffers 152 and 153 along with their corresponding data words, and the video output interface 158 may be configured to pass the frame perspective identifiers to the video port 159 without actually determining whether the corresponding data words are associated with left or right-image perspectives. Various other techniques for providing the frame perspective identifiers to the frame grabber apparatus 118 may be employed.

Moreover, the frame grabber logic 165 may utilize the frame perspective identifiers inserted by the video output interface 158 to ensure that the logic 165 grabs a complete left perspective and a complete right perspective of the same image. For example, once the frame grabber logic 165 is instructed by the control logic 131 to grab an image frame from the graphics adapter 114, the frame grabber logic 165 may monitor the frame perspective identifiers received from the digital video port 172 until there is a transition of the frame perspective identifiers. Note that a transition of the frame perspective identifiers indicates that the newly received word is associated with a new perspective. In particular, the newly received word is the first word transmitted by the video output interface 158 after the video output interface 158 has transitioned from transmitting one perspective (e.g., left) to the other perspective (e.g., right).

Once the frame grabber logic 165 detects a transition of the frame perspective identifiers, the frame grabber logic 165 preferably begins to grab (e.g., store) each word received from the digital video port 172. If desired, the frame grabber logic 165 may also grab the frame perspective identifier of each word so that the left and right perspectives can be readily distinguished based on the frame perspective identifiers in any future processing of the grabbed data.

Once the frame perspective identifiers received by the digital video port 172 transition yet again, the frame grabber logic 165 is aware that an entire perspective has been grabbed. If desired, the frame grabber logic 165 may mark the grabbed data as the right or left perspective based on the frame perspective identifiers. For example, if the frame perspective identifiers indicate that the grabbed data corresponds to a left perspective, the frame grabber logic 165 may mark the data grabbed up to this point as a left perspective. However, if the frame perspective identifiers indicate that the grabbed data corresponds to a right perspective, then the frame grabber logic 165 may mark the data grabbed up to this point as a right perspective.

After grabbing the first perspective, the frame grabber logic 165 preferably continues to grab each data word received from the digital video port 172 until the frame perspective identifiers transition yet again. Once this occurs, the frame grabber logic 165 is aware that the second perspective has been completely grabbed. Therefore, the frame grabber logic 165 is aware that both the left and right perspectives of the desired image frame have been grabbed. As a result, the frame-grabbing process is complete, and the frame grabber logic 165 can stop grabbing data. If desired, the frame grabber logic 165 may mark the second grabbed perspective as the right or left perspective, as appropriate, based on the frame perspective identifiers.

Figure 3:
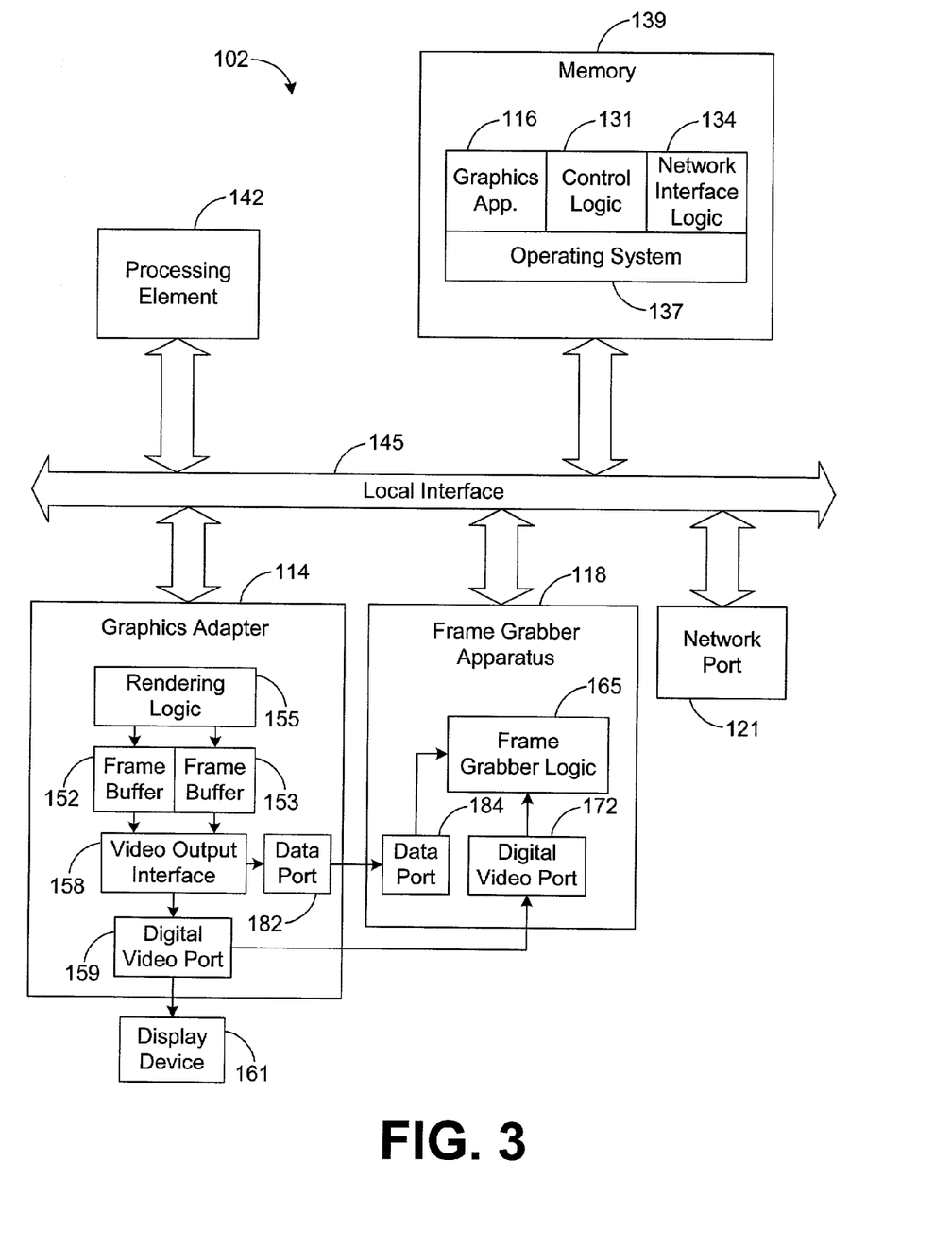
FIG. 3 is a block diagram illustrating a server, such as is depicted in FIG. 1, for grabbing image frames in accordance with another exemplary embodiment of the present invention.

It should be noted that it is not necessary for the video output interface 158 to include the frame perspective identifiers in the video signal transmitted to the digital video port 159. For example, in another embodiment, the video output interface 158 may transmit the frame perspective identifiers in parallel with the video signal transmitted to the digital video port 159. As shown by FIG. 3, the graphics adapter 114 may comprise a data port 182 for transmitting the parallel frame perspective identifiers to the frame grabber apparatus 118, and the frame grabber apparatus 118 may comprise a data port 184 for receiving the parallel frame perspective identifiers from the graphics adapter 114. The data ports 182 and 184 may be interconnected via a Video Electronics Standards Association (VESA) sync cable or some other suitable connection.

In the embodiment shown by FIG. 3, the frame perspective identifier of a data word is preferably simultaneously transmitted to the frame grabber apparatus 118 along with its associated data word. Thus, the frame grabber logic 165 may associate frame perspective identifiers with their corresponding data words based on when the frame perspective identifiers and data words are received by ports 184 and 172, respectively. Furthermore, the frame grabber logic 165 may utilize the received frame perspective identifiers in the same manner described above in order to ensure that the logic 165, when instructed, grabs a complete right perspective and a complete left perspective of a desired image.

In this regard, the frame grabber logic 165 can determine whether or not a newly-received data word from digital video port 159 corresponds to a new image perspective based on the state of its associated frame perspective identifier (i.e., the frame perspective identifier simultaneously received by the data port 184). That is, if the associated frame perspective identifier associated with the last data word has transitioned relative to the frame perspective identifier associated with the penultimate data word (i.e., the data word received just prior to the last data word), then the last data word corresponds to a new image perspective.

It should be noted that it is not necessary for the frame grabber logic 165 to utilize the frame perspective identifiers to determine when to start and stop grabbing data for an image frame. For example, while reading from a frame buffer 152 or 153, the video output interface 158 may be configured to transition from one image perspective to another by performing a vertical retrace, as described above. In such an embodiment, the video output interface 158 may insert information indicative of when it performs vertical retraces in the video signal transmitted to the digital video ports 159 and 172, or the video output interface 158 may provide such information in parallel via data ports 182 and 184, for example. The frame grabber logic 165 may then utilize this information to start and stop grabbing data.

In this regard, when the frame grabber logic 165 receives a command to grab an image frame, the frame grabber logic 165 may wait for a vertical retrace to occur. Note that the frame grabber logic 165 may determine when the next vertical retrace occurs by analyzing the aforementioned vertical retrace information provided by the video output interface 158. Once such a vertical retrace occurs, the frame grabber logic 165 is aware that the video output interface 158 is initiating the transmission of a new perspective, and in response, the frame grabber logic 165 begins grabbing data from the video signal received by the digital video port 172. The frame grabber logic 165 preferably continues grabbing data from such signal until the occurrence of a vertical retrace occurs after both image perspectives have been grabbed.

It should also be noted that, in some embodiments of the present invention, locking the graphics adapter 114 before initiating a grab of an image frame, as described above, is not included. Indeed, the locking of the graphics adapter 114 in this manner generally prevents the graphics adapter 114 from receiving and executing any graphics commands during the period that the graphics adapter 114 remains locked, thereby potentially reducing the rendering efficiency of the rendering logic 155. Instead, in some embodiments, the graphics adapter 114 executes at least some commands while a frame grab is being performed. Thus, in such embodiments of the present invention, which will be described in more detail below, the graphics adapter 114 is allowed to execute commands that do not cause an update to the data being grabbed (i.e., the data in the "front buffer").

In such an embodiment, when the control logic 131 receives a request to grab an image frame, the control logic 131 does not submit a system call for locking the graphics adapter 114, as described above for the preferred embodiment. Instead, the control logic 131 transmits a conditional stall command to the graphics adapter 114. This command instructs the rendering logic 155 of the graphics adapter 114 to stall execution of graphics commands that may cause an immediate or eventual update to the data in the "front buffer" (i.e., the buffer 152 or 153 being read by the video output interface 158). Note that a command potentially causing an immediate or eventual update to the data in the front buffer 152 or 153 will be referred to hereafter as a "front buffer update command." Examples of front buffer update commands include, but are not limited to, buffer swap commands and commands, such as those pertaining to two-dimensional (2-D) graphical user interfaces, that draw directly into the "front buffer." In response to the conditional stall command, the rendering logic 155 monitors the commands processed by it and stalls each command determined to be a front buffer update command.

Moreover, after transmitting the conditional stall command to the graphics adapter 114, the control logic 131 instructs the frame grabber logic 165 to initiate a grab of an image frame. In response, the frame grabber logic 165 preferably grabs an image frame according to the techniques described above. However, to ensure that the frame buffer 152 or 153 being read by the video output interface 158 during the frame grab is not updated before the frame grab is complete, the control logic 131 preferably waits for a certain amount of time between the transmission of the conditional stall command to the graphics adapter 114 and the transmission of the frame grab instruction to the frame grabber logic 165. This certain amount of time is preferably sufficient to ensure that the rendering logic 155 has received the conditional stall command and has started monitoring graphics instructions in response to the command.

To ensure that a sufficient amount of time has elapsed, the rendering logic 155 may be configured to transmit an acknowledgement to the control logic 131 in response to the conditional stall command. Receipt of the acknowledgement preferably indicates that the rendering logic 155 has received the conditional stall command and that the frame grab may, therefore, commence. In such an embodiment, the control logic 131 may be configured to instruct the frame grabber logic 165 to initiate a frame grab in response to the acknowledgement.

Note that some graphics instructions may already be in the process of executing when the rendering logic 155 receives the conditional stall command. Depending on the configuration of the rendering logic 155, it may not be possible for the rendering logic 155 to stall such instructions. The rendering logic 155 preferably allows the execution of any such instructions to complete prior to transmitting the acknowledgement to the control logic 131. Waiting for these instructions to execute before transmitting an acknowledgement ensures that the front buffer 152 or 153 is not updated during the frame grab via execution of such instructions.

Moreover, as the frame grabber logic 165 is grabbing an image frame in response to the frame grab instruction from the control logic 131, updates to the buffer 152 or 153 being read by the video output interface 158 preferably do not occur since the rendering logic 114 is stalling any front buffer update commands. Therefore, the frame grabber logic 165 is able to grab a complete left perspective and a complete right perspective of the same image regardless of the commands received by or being processed by the graphics adapter 114.

Once the image frame is grabbed, the control logic 131 preferably transmits an unstall command to the rendering logic 155. In response to the unstall command, the rendering logic 155 removes any stalls that occurred in response to the previously transmitted conditional stall command. Furthermore, the rendering logic 155 stops monitoring the graphics commands for stalling front buffer update commands. Therefore, until another conditional stall command is received by the rendering logic 155, the rendering logic 155 executes the graphics commands, including front buffer update commands, received from the graphics application 116. Note that, in the aforedescribed embodiment, the rendering logic 155 may continue to execute some graphics commands (i.e., commands other than front buffer update commands), after the commencement of a frame grab, thereby helping to improve its overall rendering performance.

Note that, in another embodiment, the graphics adapter 114 may instead be configured to stall all commands, not just front buffer update commands, in response to the stall signal from the control logic 131.

It should be further noted that the graphics adapter 114 and the frame grabber apparatus 118 may be implemented on one or more printed circuit boards (not specifically shown). For example, the graphics adapter 114 may reside on a first printed circuit board (PCB), and the frame grabber apparatus 118 may reside on another PCB. In such an embodiment, each of the PCBs may be interfaced with the local interface 145, and the digital video port 159 of the graphics adapter 114 may be interfaced with the digital video port 172 of the frame grabber apparatus 118 via a suitable connection, such as a standard video sync cable, for example. In addition, each of the PCBs may comprise one or more processing elements (not specifically shown) for executing any software residing on the PCB, although such software may be executed by the processing element 142 shown by FIG. 2, if desired.

However, it should be emphasized that other configurations of the graphics adapter 114 and the frame grabber apparatus 118 are possible. For example, both the graphics adapter 114 and the frame grabber apparatus 118 may reside on a single PCB. Furthermore, in embodiments where the graphics adapter 114 and the frame grabber logic 165 are implemented in software, it is possible to store the graphics adapter 114 and/or the frame grabber logic 165 in the memory 139 shown by FIG. 2.

Furthermore, it is possible for the graphics adapter 114 to employ more than two frame buffers in rendering data for the video data signal provided to the digital video port 159. Indeed, triple buffer configurations are often employed to in rendering graphical data, and the graphics adapter 114 may employ such a triple buffer configuration or other type of buffer configuration, if desired. In such embodiments, the frame grabber logic 165 may be configured to grab a frame of graphical data from the video data signal received from the digital video port 159 via the same techniques described herein.

Figure 4:
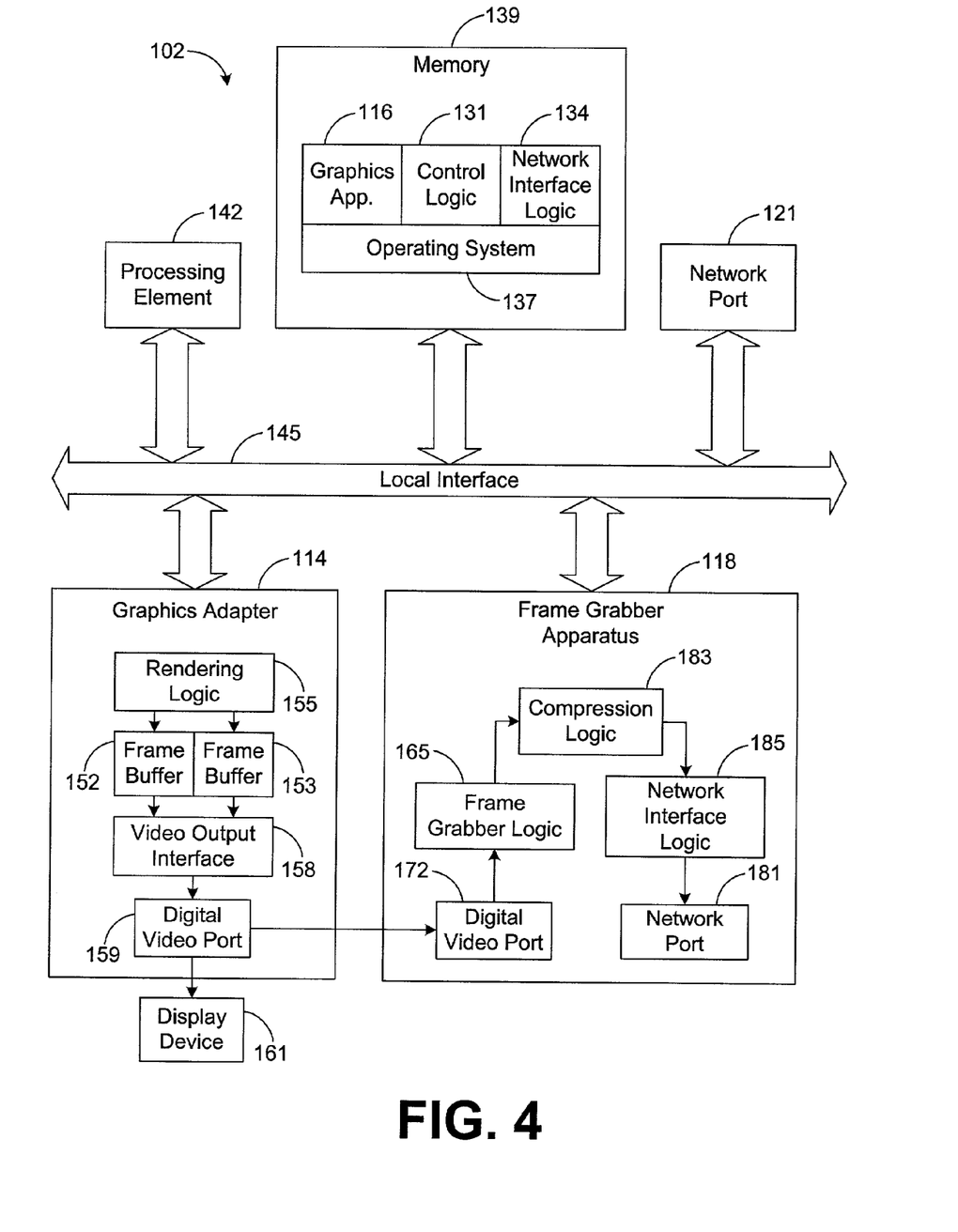
FIG. 4 is a block diagram illustrating a server, such as is depicted in FIG. 1, for grabbing image frames in accordance with a further exemplary embodiment of the present invention.

In addition, as shown by FIG. 4, it is possible to employ a network port 181 within the frame grabber apparatus 118. In such an embodiment, the frame grabber logic 165 may be configured to transmit each grabbed frame to the remote client 112 via the network port 181 of the frame grabber apparatus 118 without transmitting the grabbed frame over the local interface 145. Note that in this embodiment, compression logic 183 for compressing the grabbed frame and network interface logic 185 for transforming the grabbed frame into a suitable form (e.g., for packetizing the grabbed frame) for transmission over the network 110 (FIG. 1) may be implemented within the frame grabber apparatus 118, if desired. The compression logic 183 and the network interface logic 185, like the frame grabber logic 165, may be implemented in hardware, software, or any combination thereof. Furthermore, in other embodiments, the compression logic 183 and/or the network interface logic 185 may reside within the frame grabber apparatus 118 without a network port 181. In such an embodiment, the grabbed frame may be compressed by the compression logic 183 and transmitted by the network port 121 after any desired transformations are performed by the network interface logic 134 or 185.

In addition, the embodiments of the present invention described above have been described as rendering stereographic data to the frame buffers 152 and 153 of the graphics adapter 114. However, in other embodiments, it is possible to render non-stereographic data to the frame buffers 152 and 153 and to grab a frame of the non-stereographic data via the frame grabber apparatus 118. In such an embodiment, the control logic 131, according to the techniques described above, preferably locks the graphics adapter 114 or submits a conditional stall command to the graphics adapter 114 before instructing the frame grabber logic 165 to grab a frame of data from one of the buffers 152 or 153. Thus, when non-stereographic data is rendered to the frame buffers 152 and 153, the operation of the system 100 may be essentially the same as described above for the previously described embodiments except that a grabbed frame of data would not comprise left and right perspectives of an image. The preferred use and operation of the remote visualization system 100 and associated methodology are described hereafter.

For illustrative purposes, assume that stereographic data defined by graphics commands from the graphics application 116 at the server 102 (FIG. 1) is being rendered to frame buffers 152 and 153 (FIG. 2) by the graphics adapter 114. During this rendering, the server 102 may receive, from the remote client 112 or some other source, a frame grab request (i.e., a request to retrieve a frame of the stereographic data being rendered by the graphics adapter 114). Note that such a request may be in the form of a refresh request if the remote client 112 is presently displaying an image previously rendered by the graphics adapter 114.

Figure 5:
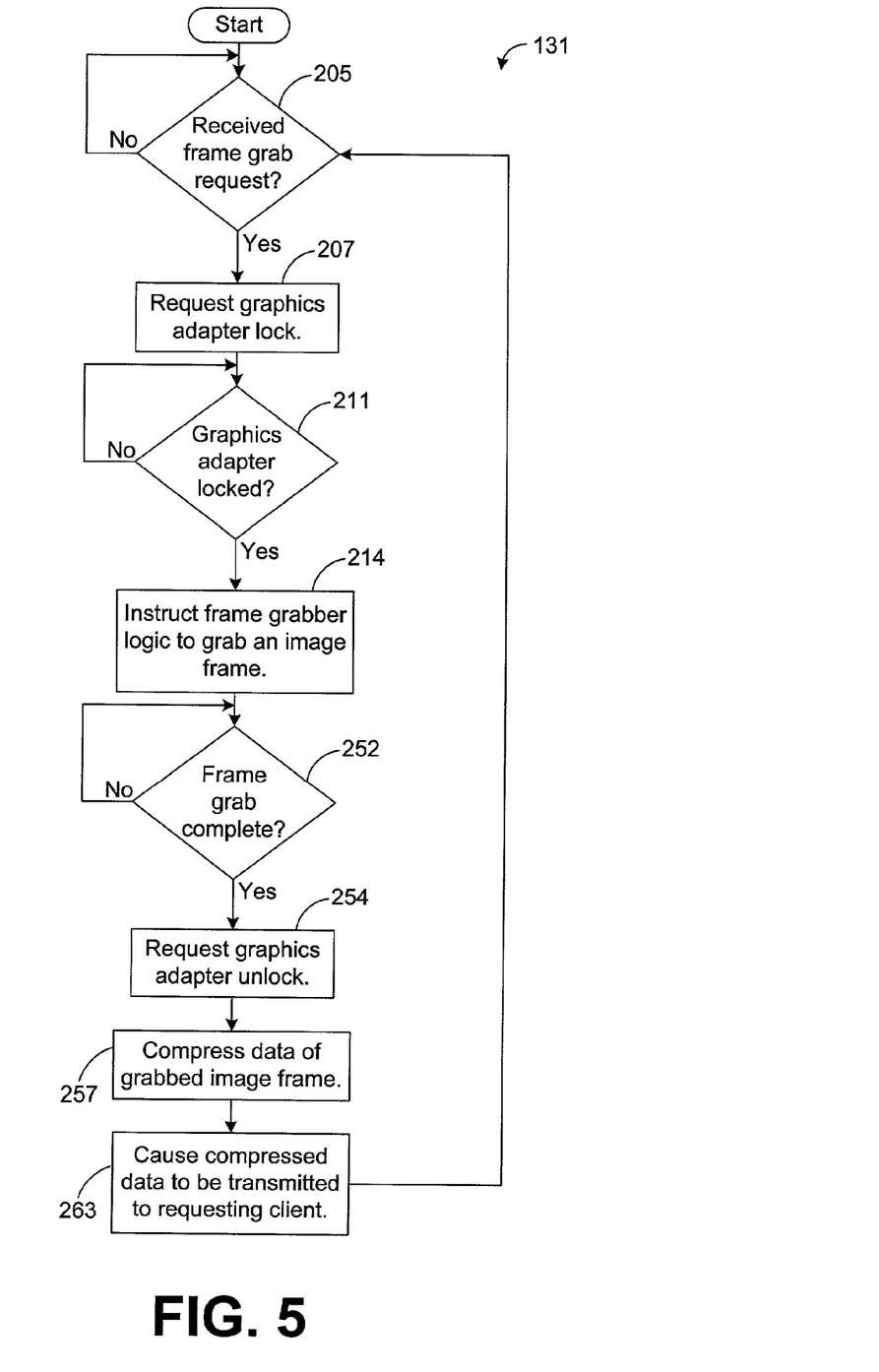
FIG. 5 is a flow chart illustrating an exemplary architecture and functionality of frame grabber control logic, such as is depicted in FIG. 2.

In response to the foregoing request, the frame grabber control logic 131 submits, to the operating system 137, a system call for locking the graphics adapter 114, as shown by blocks 205 and 207 of FIG. 5. In response to this system call, the operating system 137 locks the graphics adapter 114 by preventing the resources of the server 102, including the graphics application 116, from submitting commands to the graphics adapter 114. Note that the operating system 137 may provide the control logic 131 with an acknowledgement of the system call to inform the logic 131 that the system call has been received and serviced.

Once the control logic 131 verifies that the graphics adapter 114 has been locked, the control logic 131 instructs the frame grabber logic 165 of the frame grabber apparatus 118 to grab a frame of data from the graphics adapter 114, as shown by blocks 211 and 214 of FIG. 5. In response to this instruction from the control logic 131, the frame grabber logic 165 analyzes the frame perspective identifier associated with the next graphical data word received by the digital video port 172, as shown by blocks 221 and 223 of FIG. 6. For illustrative purposes, assume that the video output interface 158 of the graphics adapter 114 is reading frame buffer 152 when the graphics adapter 114 is locked. In such an example, the video output interface 158 preferably continues to read and to transmit, to the digital video data port 159, the image frame stored in the frame buffer 152 at the time of the graphics adapter lock. Therefore, the frame grabber logic 165 will grab the image frame stored in the frame buffer 152.

Figure 6:
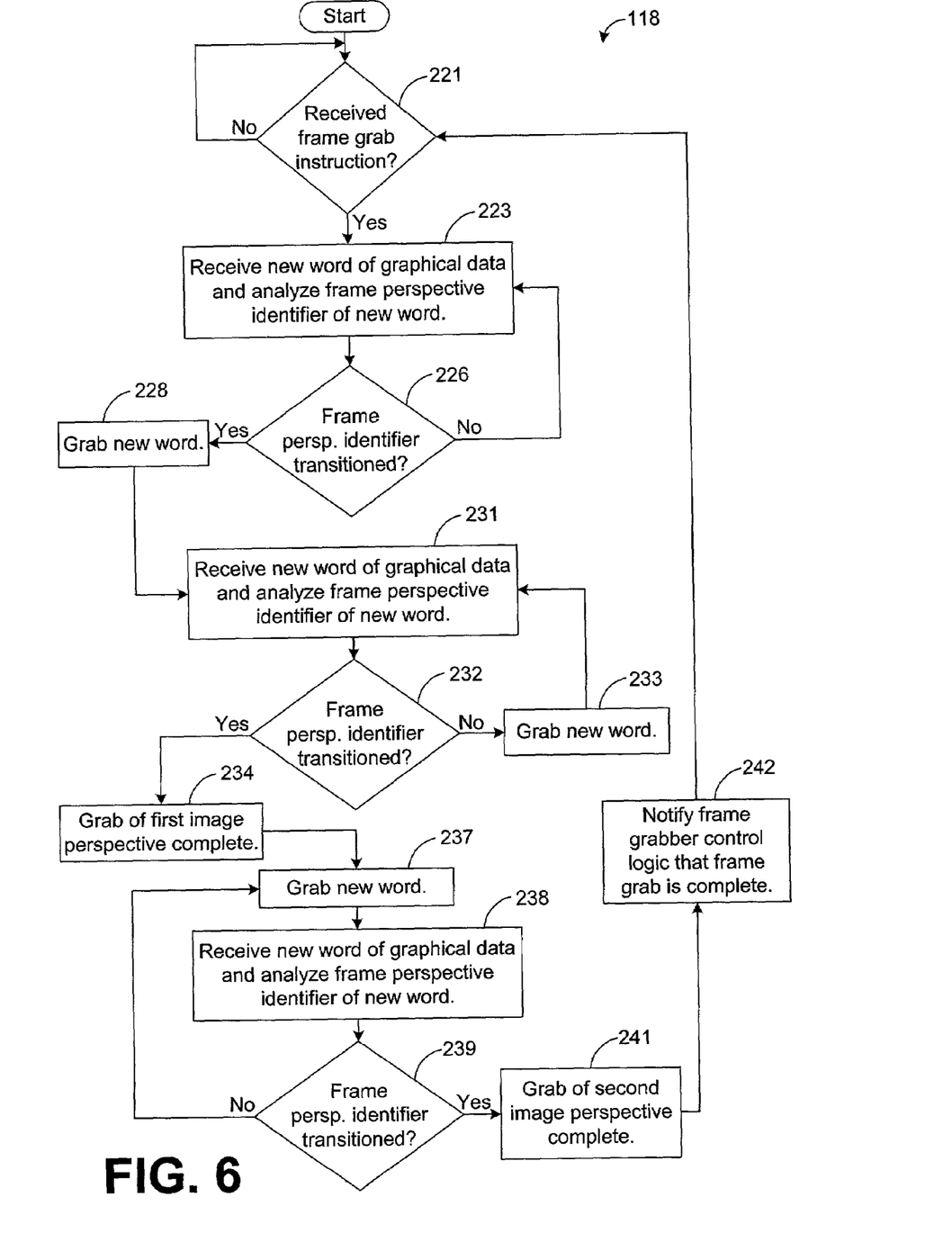
FIG. 6 is a flow chart illustrating an exemplary architecture and functionality of frame grabber logic, such as is depicted in FIG. 2.

As shown by block 226 of FIG. 6, if the frame perspective identifier of the new data word received in block 223 has not transitioned relative to the frame perspective identifier of the penultimate data word received by the digital video port 172, block 223 is repeated. In other words, if the state of the frame perspective identifier of the new data word is the same as the state of the frame perspective identifier of the prior consecutive data word, the frame grabber logic 165 waits for yet another data word to be received by the video data port 172. The frame grabber logic 165 then analyzes the frame perspective identifier of this new data word.

Once a transition in the frame identifiers is detected in block 226, the graphics adapter 114 has begun transmitting, to the digital video port 172, a new perspective (either right or left) of the image defined by the data stored in frame buffer 152. Therefore, in response to the detection of such a transition, the frame grabber logic 165, in block 228, preferably grabs the most recently-received graphical data word, which represents the first word of the new perspective.

As shown by blocks 231–233, the frame grabber logic 165 preferably continues to grab each newly-received data word of the new perspective until the frame perspective identifiers transition, causing a "yes" determination in block 232. Once this occurs, the frame grabber logic 165 has grabbed a complete perspective (either right or left) of the image frame stored in the frame buffer 152, as shown by block 234. At this point, the digital video port 172 has stopped receiving the foregoing perspective and has begun receiving the opposite perspective of the image stored in the frame buffer 152.

As shown by blocks 237–239, the frame grabber 165 preferably begins grabbing each newly-received graphical data word until the frame perspective identifiers transition yet again, causing a "yes" determination in block 239. Once this occurs, the frame grabber logic 165 has grabbed both perspectives (right and left) of the image frame stored in the frame buffer 152, as shown by block 241. Therefore, the frame grab is complete, and the frame grabber logic 165 preferably notifies the control logic 131 of the completed frame grab in block 242.

In response to such a notification from the frame grabber logic 165, the control logic 131 submits, to the operating system 137, a system call for unlocking the graphics adapter 114, as shown by blocks 252 and 254 of FIG. 5. In response to this system call, the operating system 137 unlocks the graphics adapter 114 by allowing the resources of the server 102, including the graphics application 116, to submit commands to the graphics adapter 114.

After submitting an unlock system call to the operating system 137, the control logic 131, in block 257 (FIG. 5), preferably compresses the data grabbed by the frame grabber logic 165 in blocks 228 and 237 of FIG. 6. The control logic 131 then causes the network interface logic 134 to communicate the compressed data to the remote client 112 via the network port 121, as shown by block 263 of FIG. 5. As a result, the remote client 112 receives the image frame previously requested by the client 112, and the remote client 112 may decompress and display this image frame. Note that the aforedescribed process can be repeated in order to refresh this displayed image.

Figure 7:
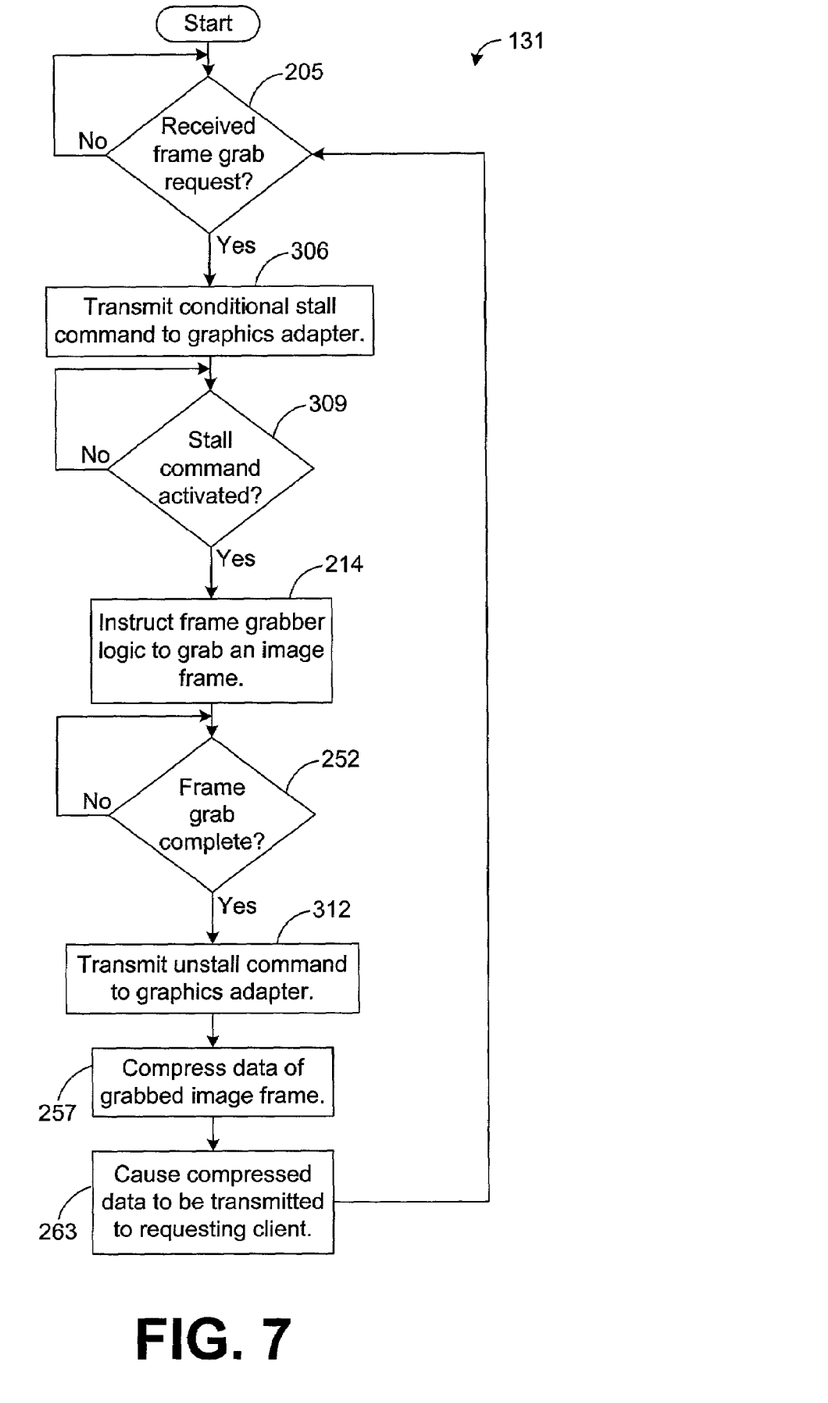
FIG. 7 is a flow chart illustrating another exemplary architecture and functionality of frame grabber control logic, such as is depicted in FIG. 2.

Also note that FIG. 7 depicts an architecture and functionality of the control logic 131 for another embodiment of the present invention where the graphics adapter 114 is allowed to process and execute at least some graphics commands during a frame grab. As can be seen by comparing FIG. 7 to FIG. 5, the operation of the control logic 131 in the present embodiment is similar to its operation in the aforedescribed embodiment shown by FIG. 5. However, instead of locking the graphics adapter 114 in response to a frame grab request, the control logic 131 transmits a conditional stall command to the graphics adapter 114 in block 306 of FIG. 7. Once the graphics adapter 114 receives the command and activates the command (i.e., is able to prevent updates to the frame buffer 152 in response to the command), the control logic 131 instructs the frame grabber logic 165 to grab an image frame, as shown by blocks 309 and 214 of FIG. 7. In other words, the control logic 131 instructs the frame grabber logic 165 to grab an image frame once updates to the frame buffer 152 have been disabled. In response to the frame grab instruction from the control logic 131, the frame grabber logic 165 grabs an image frame from the frame buffer 152 preferably by implementing the process depicted in FIG. 6.

After the frame grab is complete, the control logic 131 then transmits an unstall command to the graphics adapter 114 in block 312 of FIG. 7. In response to this command, the rendering logic 155 refrains from initiating any stalls due to the conditional stall command previously transmitted in block 306 and removes any stalls previously initiated in response to this conditional stall command. Therefore, updates to the frame buffer 152 are enabled. After transmitting the unstall command, the control logic 131 then compresses, in block 257 of FIG. 7, the data previously grabbed by the frame grabber logic 265 and causes, in block 263 of FIG. 7, the network interface logic 134 to transmit the compressed data to the remote client 112.

Note that FIG. 5 and FIG. 7 both depict an embodiment where the control logic 131 waits for a new frame grab request before initiating a new frame grab. However, in other embodiments, it is possible for multiple frame grabs to be performed in response to the same frame grab request. For example, the control logic may be configured to receive a frame grab request and to periodically initiate multiple frame grabs in response to this frame grab request.

Now, therefore, the following is claimed:

1. A frame-grabbing system, comprising:
   a frame buffer;

a graphics adapter configured to receive graphics commands from a graphics application and to render graphical data from the graphics commands to the frame buffer;

video output interface configured to read the frame buffer and to transmit a video data signal based on graphical data stored in the frame buffer; and logic configured to perform, in response to a frame grab request, a frame grab of an image frame based on the video data signal, the image frame defined by the graphical data stored in the frame buffer, the logic further configured to prevent, in response to the frame grab request, the graphics adapter from updating the frame buffer during the frame grab.

2. The system of claim 1, wherein the frame grab request is transmitted to the system from a network, and wherein the logic is configured to transmit the grabbed image frame to a remote client via the network.

3. The system of claim 1, wherein the graphical data rendered to the frame buffer defines stereographic images, the logic further configured to ensure that the grabbed image frame comprises a left-image perspective and a right-image perspective of a single stereographic image.

4. The system of claim 1, wherein the logic, in preventing the graphics adapter from updating the frame buffer during the frame grab, is configured to prevent the graphics adapter from performing a buffer swap associated with the frame buffer during the frame grab.

5. The system of claim 1, wherein the logic, in preventing the graphics adapter from updating the frame buffer during the frame grab, is configured to lock the graphics adapter.

6. The system of claim 1, wherein the logic, in preventing the graphics adapter from updating the frame buffer during the frame grab, is configured to cause the graphics adapter to stall a command for updating the frame buffer.

7. The system of claim 6, further comprising a second frame buffer, wherein the graphics adapter is further configured to render graphical data from the graphics commands to the second frame buffer, and wherein the graphics adapter is configured to execute instructions for updating the second frame buffer during the frame grab.

8. The system of claim 1, wherein the grabbed image frame defines a stereographic image, the stereographic image comprising a left-image perspective and a right-image perspective, wherein the video output interface is configured to transmit, via the video data signal, a plurality of data words defining the grabbed image frame, and wherein the video output interface is further configured to associate each of the data words with a frame perspective identifier indicative of whether the associated data word corresponds to the left-image perspective or to the right-image perspective.

9. The system of claim 8, wherein the logic is further configured to perform the frame grab based on frame perspective identifiers associated with the data words transmitted by the video output interface.

10. The system of claim 8, wherein the logic is configured to begin grabbing the data words transmitted from the video output interface for the frame grab in response to a transition between frame perspective identifiers that are associated with consecutive ones of the data words.

11. The system of claim 1, wherein the graphics application is configured to transmit to the graphics adapter, during the frame grab, a graphics command for updating the frame buffer.

12. The system of claim 11, wherein the logic is configured to stall the graphics command during the frame grab.

13. The system of claim 1, wherein the logic is configured to grab, from the video data signal, a single image frame to be transmitted to a remote client in response to the frame grab request.

14. A frame-grabbing method, comprising:

rendering, to a frame buffer, graphical data from graphics commands received from a graphics application;

transmitting a video data signal based on graphical data stored in the frame buffer;

performing, in response to a frame grab request, a frame grab of an image frame based on the video data signal, the image frame defined by the graphical data stored in the frame buffer; and preventing, in response to the frame grab request, the graphics adapter from updating the frame buffer during the frame grab.

15. The method of claim 14, further comprising receiving the frame grab request from a network.

16. The method of claim 15, further comprising transmitting the grabbed image frame to a remote client via the network.

17. The method of claim 14, wherein the graphical data rendered to the frame buffer defines stereographic images, and wherein the method further comprises ensuring that the grabbed image frame comprises a left-image perspective and a right-image perspective of a single stereographic image.

18. The method of claim 14, wherein the preventing comprises preventing the graphics adapter from performing a buffer swap associated with the frame buffer during the frame grab.

19. The method of claim 14, wherein the preventing comprises locking the graphics adapter during the frame grab.

20. The method of claim 14, wherein the preventing comprises stalling, during the frame grab, a command for updating the frame buffer.

21. The method of claim 14, wherein the grabbed image frame defines a stereographic image, the stereographic image comprising a left-image perspective and a right-image perspective.

22. The method of claim 21, further comprising associating each of a plurality of data words of the video data signal with a frame perspective identifier indicative of whether the associated data word corresponds to the left-image perspective or to the right image perspective.

23. The method of claim 21, wherein the performing is based on frame perspective identifiers associated with the data words.

24. The method of claim 14, further comprising transmitting, from the graphics application to the graphics adapter during the frame grab, a graphics command for updating the frame buffer.

25. The method of claim 24, wherein the preventing comprises stalling the graphics command.

26. The method of claim 14, wherein a single frame to be transmitted to a remote client is grabbed from the video data signal via the frame grab.

* * * * *